(12) United States Patent
Sternberg

(10) Patent No.: US 6,616,396 B2
(45) Date of Patent: Sep. 9, 2003

(54) POWER RAMP FOR PERSONAL MOBILITY VEHICLES AND METHOD OF USE

(76) Inventor: Gerd Sternberg, 1787 Eagle Mesa Ave., Henderson, NV (US) 89012

( * ) Notice: Subject to any disclaimer, the term of this patent is extended or adjusted under 35 U.S.C. 154(b) by 0 days.

(21) Appl. No.: 09/683,414

(22) Filed: Dec. 23, 2001

(65) Prior Publication Data

US 2002/0081184 A1 Jun. 27, 2002

Related U.S. Application Data

(60) Provisional application No. 60/257,810, filed on Dec. 23, 2000.

(51) Int. Cl.[7] .................................................. B60P 1/43
(52) U.S. Cl. ....................................................... 414/538
(58) Field of Search ................................. 414/537, 538

(56) References Cited

U.S. PATENT DOCUMENTS

| | | | |
|---|---|---|---|
| 2,370,427 A | * 2/1945 | Sherry | ........................ 414/538 |
| 3,874,527 A | 4/1975 | Royce | |
| 4,084,713 A | 4/1978 | Rohrs et al. | |
| 4,212,581 A | 7/1980 | Pierce | |
| 4,299,527 A | 11/1981 | Pobocik et al. | |
| 4,685,857 A | * 8/1987 | Goeser et al. | ............. 414/522 |
| 4,715,769 A | 12/1987 | Kirtley | |
| 5,160,236 A | 11/1992 | Redding et al. | |
| 5,199,842 A | 4/1993 | Watt et al. | |
| 5,249,910 A | * 10/1993 | Ball | ........................... 414/538 |
| 5,287,580 A | 2/1994 | Nelson | |
| 5,305,486 A | 4/1994 | Smith et al. | |
| 5,380,144 A | 1/1995 | Smith et al. | |
| 5,454,684 A | 10/1995 | Berens | |
| 5,556,249 A | 9/1996 | Heine | |
| 5,829,945 A | 11/1998 | Stanley | |
| 5,853,282 A | 12/1998 | Bechler et al. | |
| 5,897,285 A | * 4/1999 | Wanderscheid et al. | .... 414/537 |
| 5,934,863 A | 8/1999 | Beck | |
| 6,042,923 A | * 3/2000 | Lewis | ......................... 428/68 |
| 6,089,816 A | * 7/2000 | Christ | ........................ 414/538 |
| 6,120,234 A | * 9/2000 | Dinverno | .................... 414/538 |

* cited by examiner

*Primary Examiner*—Steven A. Bratlie
(74) *Attorney, Agent, or Firm*—Kenehan & Lambertsen, Ltd.; John C. Lambertsen

(57) ABSTRACT

A motor vehicle mounted ramp for loading and unloading a personal mobility vehicle such as a wheelchair or a three-wheel scooter. A storage platform is removably attached to a floor of the motor vehicle, e.g., a van, and provides both a support surface for the personal mobility vehicle and a storage area for a ramp used during loading and unloading. The ramp is pulled from its storage area and pivots along an axis formed by its connection with the storage platform, such that the leading edge of the ramp rests against a ground surface. A winch attached to the storage platform is then used to move the personal mobility vehicle up or down the ramp.

13 Claims, 2 Drawing Sheets

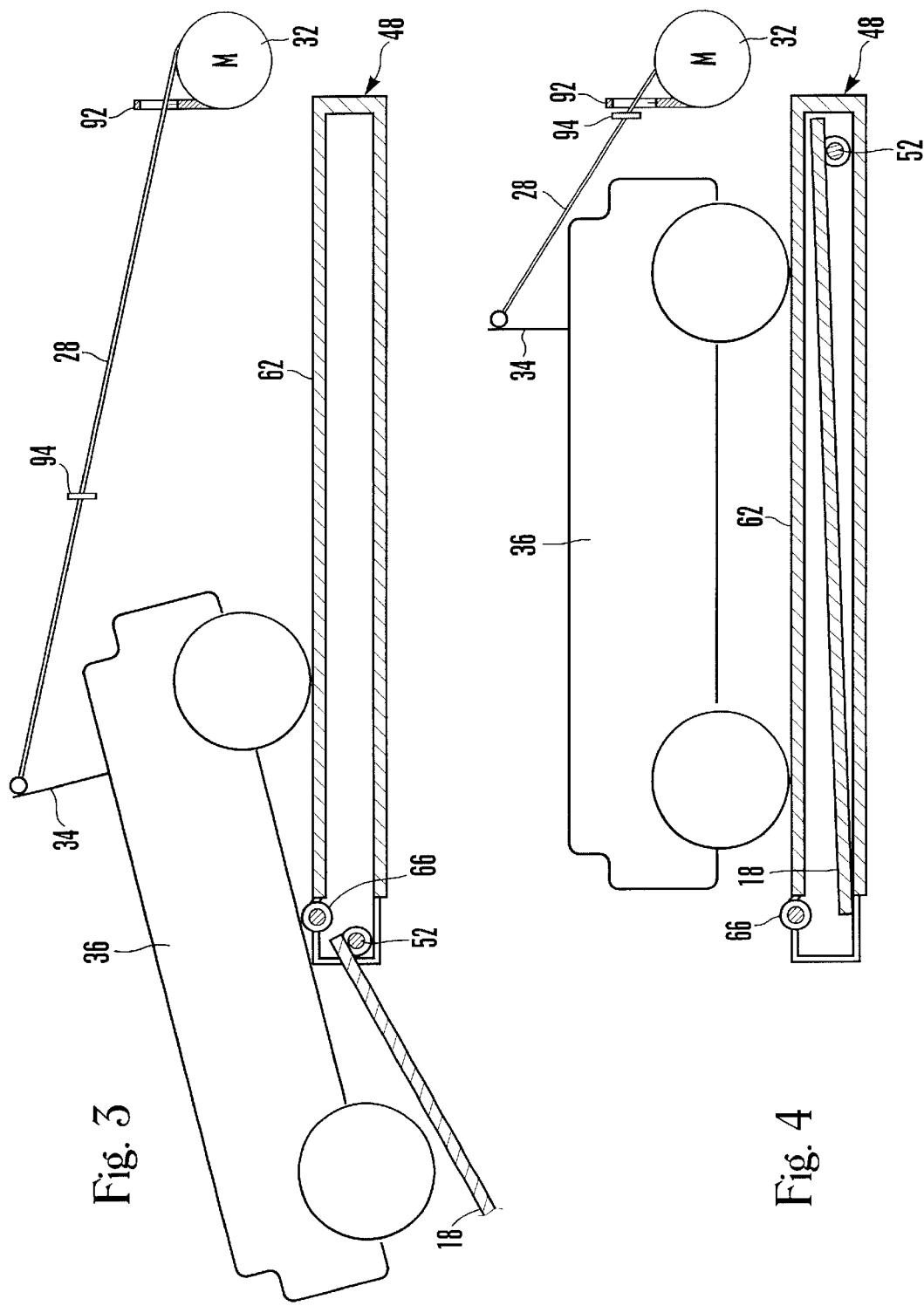

POWER RAMP FOR PERSONAL MOBILITY VEHICLES AND METHOD OF USE

CROSS REFERENCE TO RELATED APPLICATIONS

This application claims the benefit of U.S. Provisional Patent Application, Ser. No. 60/257,810, filed Dec. 23, 2000.

BACKGROUND OF INVENTION

1. Field of the Invention

The present invention relates to ramps, and more particularly, to ramps mounted within a vehicle. More specifically, the present invention relates to ramp carriers for transporting wheelchairs and other personal mobility vehicles.

2. Description of the Prior Art

Of the approximately thirty million disabled people in the United States, many are seniors disabled by age. For years, the only option in assistive technology for persons having mobility problems was the manual wheelchair. The next step up was the powered wheelchair, with the type of chair determined by the severity of that person's disability. As the disabled began to be recognized as separate individuals that together comprise a worthwhile commercial market, manufacturers began offering choices of upholstered fabrics, colors, and improved frames that were lighter, stronger, and available in a variety of finishes and colors.

Yet even with these changes, wheelchairs remained wheelchairs. Only with the development of the powered scooter did an alternative become available. Early scooters were small, front-wheel drive models designed for indoor use, with limited power and range. Improvements in both batteries and motors now provides scooters with an extended, outdoors range over a variety of terrain.

Scooter users typically have some ability to walk, but are limited in terms of distance or stamina. Often lacking upper arm strength, they have difficulty propelling manual wheelchairs; yet do not require the sophisticated electronic controls and seating offered by powered wheelchairs. Included, as potential scooter owners are those people having milder forms of cerebral palsy or muscular dystrophy, arthritis, and cardiac conditions.

While wheelchairs can be collapsed and fit into backseats and car trunks, scooters typically weigh as much as the rider, and it is recognizably out of the question for a physically impaired rider to attempt such similar stowage techniques. Thus, one strategy has been to develop specially modified vans to permit the rider to remain on the scooter while entering, leaving, and driving. In one case, such modifications included lowering the floor and providing a lightweight aluminum wheelchair ramp. Unfortunately, the average conversion price is $13,000 to $16,000, which, when combined with an initial vehicle cost of $20,000 to $30,000, places this option out of the financial reach of many.

For those not looking for such extensive vehicle modifications, there are other options to assist the driver when entering and leaving a van. There are two types of ramps available, one having a central panel and side rails, the other consist of individual "tracks". In the case of the latter, when three-wheel scooters are in use, three sets of tracks are required. One issue raised by this less expensive option is whether the deployment and storage of these ramps is within the capability of person or is a personal care attendant required to accompany the person of challenged mobility.

Alternatively, the wheelchair or scooter user can make use of semi-automatic and automatic lift devices. Such devices can be installed in side or rear doors, with some requiring bumper and/or roof modifications. For those scooter users that can walk from the rear of the van to a side door, there is a lift system that will pick up an assembled scooter and stow it in the back of the van. These devices also can be prohibitively expensive in terms of installation and purchasing costs.

The stowage and retrieval of scooters from within personal vehicles requires either an expensive system professionally installed or the attempted assembly and installation of lesser systems that themselves are also mechanically complex. These lesser systems also require substantial user strength for proper positioning of the scooter and then some driving skill to maneuver the scooter into the transport vehicle. Finally, such complex systems also permanently alter the structure of the vehicle, and with their removal difficult, can also reduce the carrying capacity of the vehicle on an essentially permanent basis. A need exists for inexpensively providing a mechanical device that assists in the placement of a scooter or like device into and out of a personal motor vehicle, and that is easily installed and removed from that vehicle during extended periods of non-use.

SUMMARY OF INVENTION

The device according to the present invention provides a support platform within the motor vehicle that attaches to the floor using either existing hardware or restraining members that utilize previously existing structures to enable the easy installation and removal of the platform. In addition to providing a support surface for the personal mobility vehicle, the support platform also provides an out-of-the-way storage area for the ramp used to raise and lower the personal mobility vehicle to and from the support platform.

As the need arises, the ramp is pulled from its storage position within the support platform and its front edge is lowered to the ground. A winch attached to the support platform is used to raise and lower the personal mobility vehicle up and down the ramp. The winch attachment also provides additional stability to the personal mobility vehicle while it rests upon the support platform during its transport within the motor vehicle.

Some further objects and advantages of the present invention shall become apparent from the ensuing description and as illustrated in the accompanying drawings.

BRIEF DESCRIPTION OF DRAWINGS

FIG. 3 is a schematic representation in side elevation of a scooter as partially received upon a storage platform during use of the power ramp mechanism in accordance with the present invention; and FIG. 4 is a schematic representation in side elevation of a scooter as fully received upon the storage platform of FIG. 3 in accordance with the present invention.

DETAILED DESCRIPTION

Figure 1:
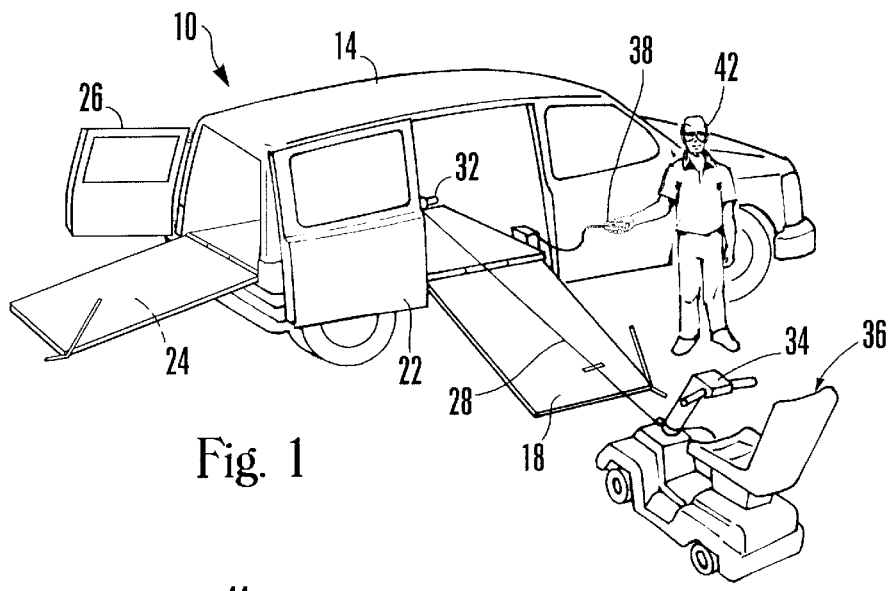
FIG. 1 is a perspective view showing a scooter as positioned for loading into a van in accordance with the present invention.

Reference is now made to the drawings wherein like numerals refer to like parts throughout. A power ramp system 10 is shown as installed in a passenger motor vehicle of the type termed a "van" 14. A ramp 18 is shown extending from a side door 22. Alternatively, a rear ramp 24 may be positioned instead to extend from a rear door 26 (also shown in FIG. 1).

A winch line 28 extends from a winch 32 located within the van 14, and is attached to a steering column 34 of a personal mobility vehicle, such as a powered scooter 36 shown in FIG. 1, using a rope or fabric harness 37. Operation of the winch 32, and hence movement of the scooter 36, is governed by a control unit 38, shown held by a person 42 in FIG. 1. As is shown in FIG. 1A, a presently preferred manner of attaching the winch line 28 to the powered scooter 36 utilizes a metal ring 44 that is attached to a safety clasp 46. The fabric or rope harness 37 can then be easily attached to the metal ring 44, and then looped around the steering column 34 of the powered scooter 36 (not shown in FIG. 1A) during loading and off-loading operations. Preferably, the winch line 28 remains attached to the powered scooter 36 while it is parked on the storage platform 48 to provide additional stability.

Figure 2A:
FIG. 2A is a partial perspective view showing an alternative hoist harness connector in accordance with the present invention.
Figure 2:
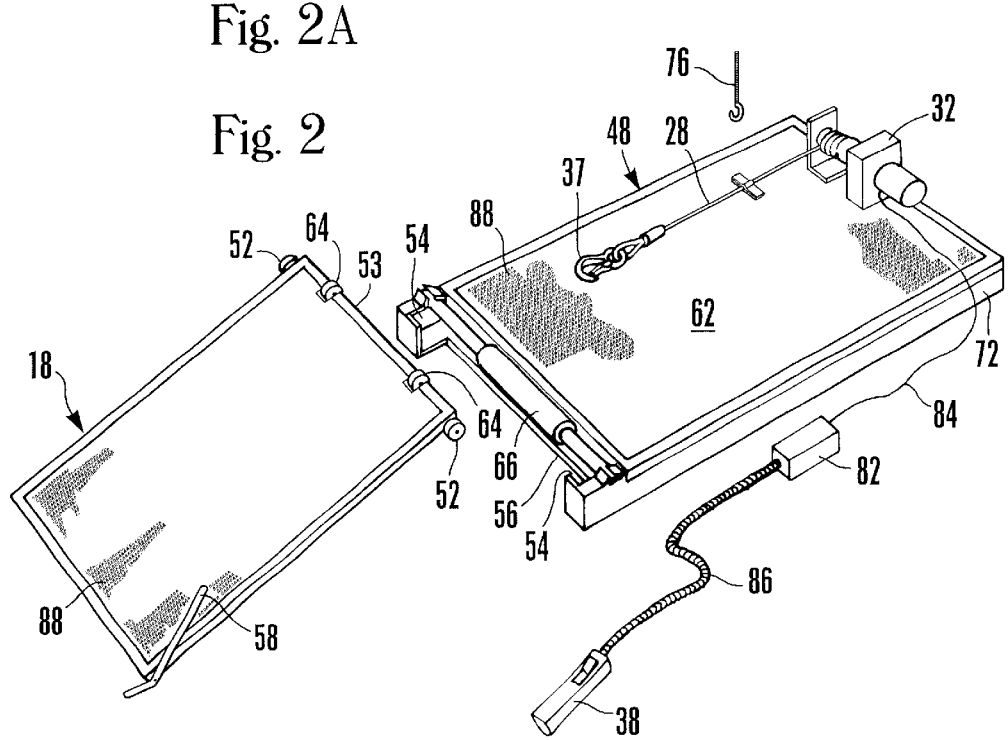
FIG. 2 is a perspective view of a hoist and ramp assembly in a partially disassembled arrangement in accordance with the present invention.

Further details of the powered ramp and winch system are shown in FIG. 2, where the ramp 18 has been separated from a storage platform or ramp base 48. A pair of ramp platform rollers 52 are each positioned adjacent opposite ones of both lateral edges of a leading edge 53 of the ramp 18. The platform rollers 52 are received by a corresponding pair of receiving notch extensions 54 located at opposite lateral edges at a terminus 56 of the storage platform 48.

Upon being received by the pair of notch extensions 54, the platform rollers retain the ramp 18 in position to accept the scooter 36 (not shown in FIG. 2) or, alternatively, be lifted by an attached ramp handle 58, and when positioned substantially co-planar with the storage platform 48, then retracted into the storage platform 48, assuming a stored position located under a support surface 62 of the storage platform 48. The manner of such storage retraction and subsequent deployment will be subsequently discussed in further detail in context with FIGS. 3 and 4.

Returning again to FIG. 2, a pair of support rollers 64 are located along the leading edge 53 of the ramp 18. In a similar manner, a loading assist roller 66 is centrally located along the terminus 56 of the storage platform 48. In both instances these rollers are intended to assist the scooter 36 (not shown in FIG. 2) in making the transition between the ramp 18 and the storage platform 48.

A support frame 72 provides a stable foundation for the storage platform 48 as it rests upon the floor of the van 14 (not shown in FIG. 2). A retention hook 76 is designed to engage with metal retention bars that are typically provided as part of the seat mounting mechanism in most vans. Upon removal of the passenger seat from the cargo area of the van, the seat mounting mechanism can then be used to retain the storage platform 48 in position within the cargo area. Where no such seat mechanisms are present, a hole can be drilled into the floor to receive a mounting bolt that extends into the cargo area (not shown in the Figures). In either case, the bolt or the retention hook 76 then attaches to the storage platform 48 to retain it in position within the van 14. This manner of retention enables quick installation and removal of the storage platform 48 as required by the user.

The winch 32 is attached to the support surface 62 of the storage platform 48 in a convention manner, such as by bolts (not shown), and is located towards mid-platform (fore-aft), at the far end from the van door. Electrical power to the winch 32 is provided through a power box 82, and an electrical line 84. The control unit is attached to the power box 82 through a protective cable 86, with user activation signals regulating the direction and duration of winch and winch line activation. Additionally, to further enhance the stability of the scooter 36 while on the ramp 18 and the support surface 62 of the storage platform 48, a non-slip surface 88 is formed on each surface.

Such activation and scooter movement is schematically displayed in FIGS. 3 and 4. Upon a "retractive" activation of the winch 32 by a user, the winch line 28 is wound about the take-up reel of the winch, pulling the scooter 36 up the ramp 18. As is shown in FIG. 3, the scooter is halfway through this process, and is located about half on the ramp 18 and half on the support surface 62.

Since there are practical limits as to how far the ramp 18 can extend from the van, the loading assist roller 66 eases the loading and removal of the scooter 36 when the ramp length and wheelbase interact to cause a "bottoming" of the scooter partway through the loading and removal process. The support rollers 64 (not shown in FIGS. 3 and 4) serve to space the ramp 18 from the loading assist roller 66 to prevent any binding thereof during the loading or unloading process due to movement of the ramp 18. Additionally, should the support rollers 64 be forced into contact with the loading assist roller 66, their ability to turn enables the loading assist roller 66 to continue functioning.

To prevent an "over-retraction" of the scooter 36 when loading, a limit switch 92 is provided the winch 32. An adjustable limit tag 94 is attached to the winch line 28 at a location that results in activation of the limit switch 92 when the scooter 36 reaches an appropriate location on the support surface 62 (see FIG. 4). The limit switch 92 considerably lessens the timing skills required of the operator during the loading of the scooter 36.

In addition to illustrating the operation of the limit switch 92, FIG. 4 also shows storage of the ramp 18 within the storage platform 48. As discussed earlier in the context of the pair of ramp platform rollers 52, after use of the ramp 18, it can be raised from its inclined position and then moved into a position inside the storage platform located beneath the support surface 62. The ramp platform rollers 52 assist the user in performing this sliding motion, as well as help when removing the ramp 18 from its stored position when ready for a further use of the power ramp system 10.

In a preferred embodiment, the majority of the power ramp system is fabricated out of steel or aluminum, although other materials, such as plastic would also be appropriate. For such a system as is received within a 1992 Plymouth Van, the storage platform measures 58" long by 32" wide, and is 3½" in height. A ramp for such a storage platform would measure 46" long by 28" wide, with a thickness of ⅝ inch. Plywood is an appropriate material for the ramp, and a non-slip surface such as indoor-outdoor carpeting, or other known non-slip paintable or sprayable surfaces is recommended for use on the ramp as well as on the support surface. The ramp platform rollers are preferably ¾" in diameter with an outer surface of plastic or rubber. The ramp handles is preferably fabricated out of metal or a woven rope strap and measures 18" in length. A "foot" section is formed at the base of the ramp handle to provide further support to the ramp, this foot section is preferably 6" in length.

A winch such as Model T1500 manufactured by Super Winch, Inc., of Putnam, Conn., provides sufficient power for the majority of applications, with a power demand that is appropriate for a car battery. It is presently preferred that access to the car=s power supply be obtained by connection to the car battery. This connection is preferably by a direct connection with a circuit breaker or fuse intermediately positioned. However, an easier and quicker power source can be obtained by a connection using a cigarette lighter adapter. A control unit may be used for regulating operation of the winch, and the winch line is preferably woven nylon strap of 1/8 inch thickness. It has been observed that a simple rope harness attached to the end of the winch line provides for virtually universal engagement, with the harness received over the steering column.

My invention has been disclosed in terms of-a preferred embodiment thereof, which provides an improved power ramp system for use with powered scooters and wheelchairs that is of great novelty and utility. Various changes, modifications, and alterations in the teachings of the present invention may be contemplated by those skilled in the art without departing from the intended spirit and scope thereof. It is intended that the present invention encompass such changes and modifications.

What is claimed is:

1. A vehicle ramp for loading and unloading a personal mobility vehicle comprising:
    a ramp base mounted on a floor of a vehicle, said ramp base having a support frame and a support surface that together define a storage platform having an interior storage chamber;
    a ramp having a first end portion and a second end portion removably received within said storage chamber, said first end portion hingeably mounted to said ramp base and said second end portion contacting a ground surface when said ramp is removed from within said storage chamber; and
    a winch attached to said support surface of said ramp base, said winch having an extendable and retractable cable attached to said winch and selectively attachable to said personal mobility vehicle,
whereby said personal mobility vehicle may be selectively placed and removed from said support surface of said ramp base on such occasions as said ramp is hingeably mounted to said ramp base.

2. A vehicle ramp as described in claim 1, and further comprising a pair of ramp platform rollers attached to said ramp at said first end portion, said pair of ramp platform rollers received and retained by said ramp base when said ramp is substantially fully extended from said storage chamber.

3. A vehicle ramp as described in claim 2, wherein said pair of platform rollers are rotatably received by a support surface within said storage chamber when said ramp is received therein.

4. A vehicle ramp as described in claim 3, and further comprising a loading assist roller attached to said ramp base at a location that is substantially adjacent a vehicle opening when said ramp base is mounted on said floor of said vehicle.

5. A vehicle ramp as described in claim 4, wherein said loading assist roller is attached to said ramp base at a location that is substantially co-planar with said support surface.

6. A vehicle ramp as described in claim 4, and further comprising a pair of support rollers attached to said ramp at a location substantially adjacent said first end portion.

7. A vehicle ramp as described in claim 6, wherein said loading assist roller and said pair of support rollers cooperate to assist in the passage of said personal mobility vehicle to and from said storage platform.

8. A vehicle ramp as described in claim 1, and further comprising a control unit operatively communicating with said winch.

9. A vehicle ramp as described in claim 8, wherein a user may remotely operate said winch.

10. A vehicle ramp as described in claim 9, and further comprising an electrical cable electrically connecting said control unit and said winch.

11. A device for loading and unloading a personal mobility vehicle into and out from a motor vehicle, comprising:
    a ramp removably secured to said motor vehicle;
    a storage platform removably secured to said vehicle and selectively attachable to said ramp, said storage platform comprising a support surface and a support frame that together define an interior storage chamber, said ramp removably received within said storage chamber when said ramp is not in use;
    a winch received by and secured to said support surface; and
    a winch line attached to said winch and selectively extending therefrom, said winch line terminating in a harness.

12. A loading and unloading device according to claim 11, wherein said harness is selectively attached to said personal mobility vehicle during the loading and unloading thereof.

13. A method for loading and unloading a personal mobility vehicle into and out from a motor vehicle, comprising:
    attaching a storage platform in a removable manner to a floor of said motor vehicle;
    extending a ramp from within an interior storage chamber of said storage platform;
    rotating said ramp about a point of attachment to said storage platform to permit an outer edge of said ramp to rest upon a ground support surface;
    attaching said personal mobility vehicle to a winch secured to a surface of said storage platform in a manner permitting the selective unattachment therefrom;
    operating said winch in a manner causing said personal mobility vehicle to move over said surface of said storage platform and a surface of said ramp; and
    retracting said ramp from an extended position to a position substantially within said interior storage chamber and below said surface of said storage platform.

* * * * *